Jan. 28, 1947.  M. MORRISON  2,415,022
MOTOR DEVICE
Filed July 28, 1943  2 Sheets-Sheet 1

Inventor
Montford Morrison,
By Robert F. Beck
Attorney

Inventor
Montford Morrison,
By Robert F. Becker
Attorney

Patented Jan. 28, 1947

2,415,022

UNITED STATES PATENT OFFICE 2,415,022

MOTOR DEVICE

Montford Morrison, Upper Montclair, N. J.

Application July 28, 1943, Serial No. 496,389

6 Claims. (Cl. 172—239)

The invention relates to electric motor devices in which the rotor is required to run at a predetermined, highly accurate fixed speed.

Among the objects of the invention are; to provide operable from a direct current source, an electric motor having high degree of constancy of speed, to provide such a motor with speed characteristics which are independent, over large ranges of variation, of the voltage of the current source, to provide easy and convenient means of changing the value of the fixed speed, and to provide a simple and effective method of forcing the rotor of such a motor to firmly synchronize with minute injections of alternating currents of a frequency at, or near, the operating frequency of the rotor.

This invention may be employed in many instrument and apparatus applications for the generation of precise audio frequencies, precise timing in optical systems, in the construction of measuring and testing devices, for the synchronous operation of signal devices as well as for further and other applications which will be obvious upon reading the specification and claims hereof. By the employment of this invention small, compact and light motor mechanisms may be constructed with speed regulations better than 0.01% and the present invention is applicable to devices and apparatus requiring this constancy of speed.

The invention will be more fully understood from the following description when read in connection with the accompanying drawings. Fig. 1 of which is a circuit diagram of an arrangement embodying the principles of the invention in simple form for clearness in explaining the basic operating characteristics of the invention;

Figure 1:
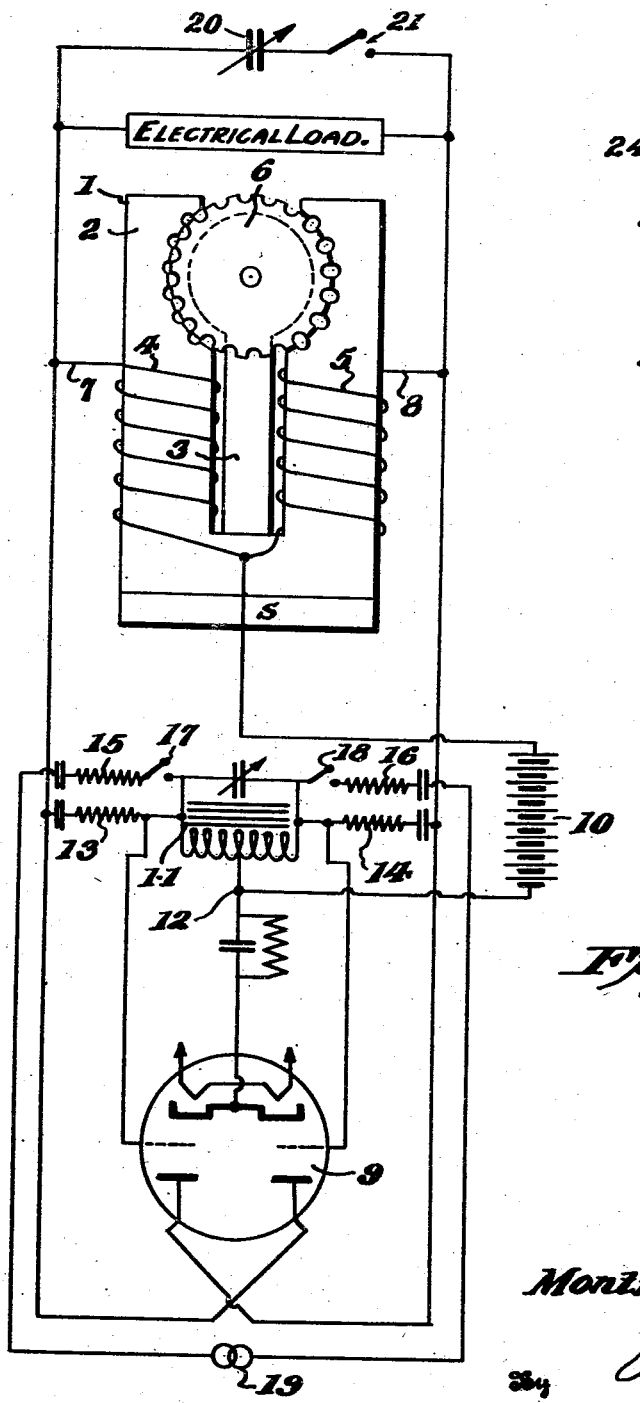

Referring to Fig. 1, which is an alternating current motor which may, in practice, be any one of the many types which can be made to operate synchronously with an applied alternating voltage. This motor may be of the inductor type with salient poles, a direct current field type with winding rotor having no salient poles, it may be of the phonic wheel type or any other suitable substitution.

In the embodiment shown in Fig. 1, I employ an inductor type motor with permanent magnet fields and of a type commonly used as a synchronous motor or an alternating current generator.

Figure 2:
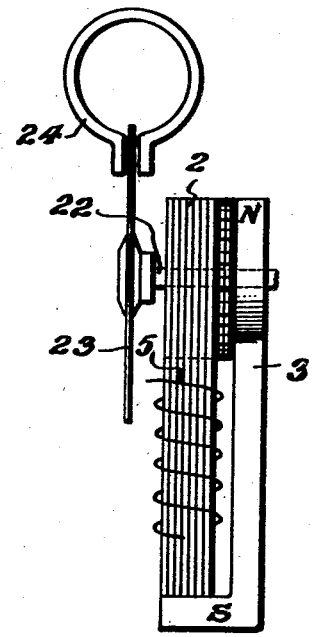
Fig. 2 is a side view illustrating in some detail the type of motor mechanism employed in the embodiment described herein and shows an eddy current disk 23 and a magnet 24, both being added to the elements illustrated in the elevation shown in Fig. 1.

The field member 2 Figs. 1 and 2 is of a laminated structure having a permanent magnet member 3 Figs. 1 and 2, which supplies the constant magnetic field for the motor. The teeth of the stator are so spaced angularly with reference to the rotor that the main magnetic circuit created by the permanent magnet 3 flows first through coil 5 and then through coil 4, and as the rotor 6 revolves, alternating current is produced between terminals 7 and 8.

The operation as described above is really that of a generator, but of course when alternating current is fed through windings 4 and 5 under proper conditions, the device may act as a motor. This is a simple illustration of a common type of motor and generator found in the communication industry and will be understood by those familiar with the art to which the present invention appertains.

However, in common practice this device, when used as a motor, is supplied with alternating current from some source of alternating current supply, such as the tuning fork generator with an amplifier to bring a power level up to a value sufficient to operate the motor.

Under these conditions a high constancy of speed control can be obtained but only at a very high apparatus cost and with an excessive amount of weight. Such a motor so operated also has, like all synchronous motors, a distinct tendency to hunt, and while the mean frequency of such a combination may have a very high precision of constancy, the instantaneous frequency value may and often does vary badly, thus making such a device unsuitable for certain types of precision work where a complete absence of hunting is essential.

In the employment of my invention there is a complete absence of hunting, which will be hereinafter more fully described.

The winding of electric motor 1 is connected push-pull to the output of twin triodes 9 supplied with plate current by battery 10. The grids of the twin triodes 9 are connected across a capacitance-inductance parallel oscillatory system 11, the center 12 of which is connection with cathodes of the twin triodes 9.

The oscillatory system 11 is connected through feed-back circuits 13 and 14 to the plates of the twin triodes 9 which are, as before stated, connected push-pull to the windings 4 and 5.

These feed-back circuits 13 and 14 are constructed along the lines of feed-back circuits used in resistance stabilized audio frequency oscillators. That is, the condensers employed are large in capacity for the frequency employed and the resistors are very high in comparison with the plate resistance of the twin triodes. The impedance of these feed-back circuits is such that the voltage developed across the oscillatory system 11 does not sensibly affect the value of the feed-back current. The resistors of the feed-back circuit are also sufficiently high, that the current through this feed-back circuit is substantially of the form and phase of the voltage across the windings 4 and 5 of the motor 1.

With such characteristics the feed-back circuit may be referred to as having a resistance current-limiting characteristic. In other words, the form and phase of the current through these resistors is such as is produced by a pure resistance, the impedance of the condensers and the oscillatory circuit being so small in comparison that they contribute no sensible effect upon the circuit impedance. Two feed-back circuits 15 and 16 are also provided so that when switches 17 and 18 are closed, alternating current from source 19 may be fed into the oscillatory system 11 with or without feed-back current.

Referring to Fig. 1, I may provide an electrical load at the position so designated and I may introduce a condenser 20 by closing the switch 21. By so doing I provide tuning for the motor winding which is useful in some applications.

Referring to Fig. 2, there is illustrated on the shaft 22 a metal disc 23 which may be caused to revolve in the field of a permanent magnet 24 producing an eddy current brake as a load on the device which is referred to hereinafter as mechanical load.

Since the feed-back circuits 13 and 14 have purely a resistance characteristic, the current follows the form, amplitude and phase of the voltage across terminals 7 and 8, but the voltage developed across parallel oscillatory system 11 will rise and fall according to the resonance curve of the oscillatory system, as a function of the frequency, as is well understood by those skilled in the art.

Figure 3:
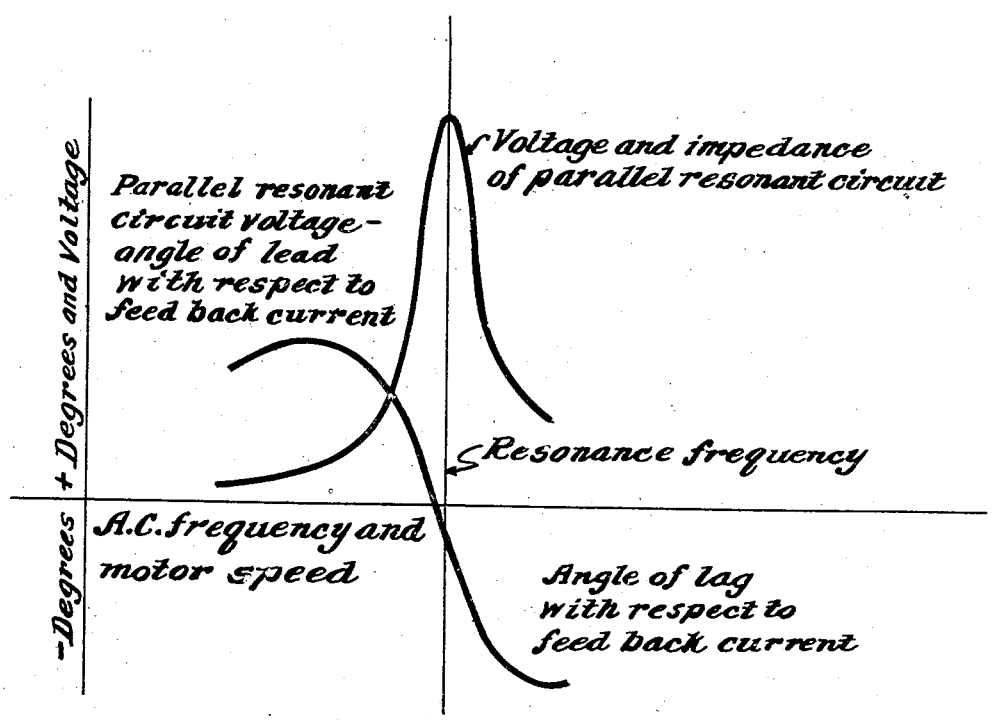
Fig. 3 shows curves of electrical circuit characteristics, useful in understanding the present invention.

In Fig. 3 is the general form of the voltage curve as a function of the frequency with the resonance value indicated, as is commonly illustrated. Also, the phase angle of this voltage curve is illustrated in Fig. 3. Since the current lags the voltage for resonance frequency in such a system, the voltage then leads the current over similar range of frequencies. The phase angle curve is slightly displaced depending upon the Q of the circuit.

It will be appreciated from Fig. 3 that oscillatory system 11 produces a grid-control which not only gives amplitude variations as a function of the voltage but phase angle variations as a function of the voltage.

The current through windings 4 and 5 has a phase displacement with the voltage at terminals 7 and 8. This phase displacement makes it possible to use the voltage feed-back from terminals 7 and 8 through feed-back resistors 13 and 14 to provide the proper phase angle for the current which is produced by grid control through the twin triode 9.

The phase angle of the plate current of the twin triode 9 is of course affected by the electrical load, so designated, tuning 20 so illustrated, or by mechanical loading, as described in Fig. 2. However, the phase angle between the voltage and the current in the windings 4 and 5 are not affected by these added parameters.

The speed at which the rotor 6 operates depends upon the phase angle, between the voltage and current in the windings 4 and 5 and the mechanical loading on the rotor, different speeds having different phase angles.

Figure 4:
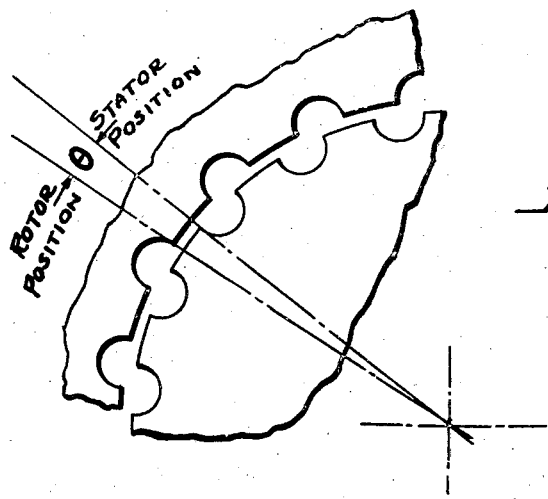
Fig. 4 is a fragmentary drawing of part of the rotor illustrative of the term "rotor phase angle" in connection herewith as used herein.

Referring to Fig. 4, the angular phase position between the rotor and the current in windings 4 and 5 is indicated by the letter $\theta$. The more the mechanical loading the larger the angle $\theta$, this lagging position accounting for the increased torque demand caused by the increased loading, as is well understood by those familiar with the art of synchronous motor operation.

In some respects this motor operates like a synchronous motor, but its speed is determined by its own characteristics rather than that of an external generator.

Its speed characteristics being determined mainly by the phase angle, between the voltage and the current in its windings and the mechanical loading, means that the motor will run at a speed, and only at that speed, corresponding to the phase angle of the current supplied to the motor, with reference to the voltage across its windings.

Of course, such a motor has to be brought up above its operating speed and allowed to coast back into the operating speed, but the speed at which it continues to operate always depends mainly upon these two factors above stated.

If the motor is brought up to a certain high speed and allowed to coast it falls to a frequency at which the oscillatory system 11 will provide the right phase angle for the requirements.

The voltage has very little effect upon the speed of the motor, even sometimes over a range of 100% increase in voltage. As a matter of fact, within operating ranges the voltage is so unrelated to the speed of the motor that it is possible to make adjustments so that the motor slows up with increased voltage and speeds up with a decrease in voltage.

In the ordinary synchronous motor, the motor is attempting to operate through a somewhat elastic system with a fixed source of frequency and the elasticity of this system together with the inertia of the parts constitute a more or less electromechanical oscillatory system in the rotor itself, commonly known as hunting.

This motor has no tendency whatever to hunt as there is no elastic connection between the rotor of the motor and its source of supply, this relation is fixed and rigid and one follows the other perfectly, and therefore there can be no hunting.

In a well designed motor having a good strong direct current field the embodiment of my invention produces a comparatively high torque motor with a high apparatus efficiency and high electrical efficiency and is entirely unlike small synchronous motors with their comparatively high current inputs and low torques, to say nothing of the instability due to hunting.

The applicant does not limit himself to the structure shown in the described embodiment. The limitations of the invention are set forth in the claims hereunder.

What I claim is:

1. An alternating-current motor system comprising a motor having a stator, a rotor and an electromagnetic field-winding surrounding said stator to supply driving energy to said rotor; a source of direct-current power subject to voltage fluctuations, a capacitance-inductance parallel oscillatory circuit having an independent oscillating period to fix the alternating-current frequency of said energy, an electronic discharge tube having a grid-control circuit and receiving plate-circuit power from said source, said plate circuit including said winding, said grid-control circuit including said oscillatory circuit, an energy feed-back circuit from said plate circuit to said oscillatory circuit, and said feed-back circuit including an impedance member to stabilize said oscillating period under operation with said voltage fluctuations.

2. An alternating-current motor system comprising a motor having a stator, a rotor and an electromagnetic field-winding surrounding said stator to supply driving energy to said rotor; a source of direct-current power subject to voltage fluctuations, a capacitance-inductance parallel oscillatory circuit having an independent oscillating period to fix the alternating-current frequency of said energy, an electronic discharge tube having a predetermined plate resistance and a grid-control circuit, said tube receiving plate-circuit power from said source, said plate circuit including said winding, said grid-control circuit including said oscillatory circuit, a feed-back circuit from said plate circuit to said oscillatory circuit, and said feed-back circuit including an impedance member having a higher resistance than said plate resistance to stabilize said oscillating period under operation with said voltage fluctuations.

3. An alternating-current motor system comprising a motor having a stator, a rotor and an electromagnetic field-winding surrounding said stator to supply driving energy to said rotor; a source of direct-current power subject to voltage fluctuations, a capacitance-inductance parallel oscillatory circuit having an independent oscillating period to fix the alternating-current frequency of said energy, said oscillatory circuit having a predetermined ohmic impedance at resonance, an electronic discharge tube having a grid-control circuit and receiving plate-circuit power from said source, said plate circuit including said winding, said grid-control circuit including said oscillatory circuit, a feed-back circuit from said plate circuit to said oscillatory circuit, and said feed-back circuit including a resistance member having a higher ohmic impedance than that of said oscillatory circuit at resonance, whereby under constant amplitude feed-back current the voltage across said oscillatory circuit is dependent upon said oscillating period and substantially upon said oscillating period only.

4. An alternating-current motor system comprising a motor having a stator, a rotor and an electromagnetic field-winding surrounding said stator to supply driving energy to said rotor; a source of direct-current power subject to voltage fluctuations, a capacitance-inductance parallel oscillatory circuit having an independent oscillating period to fix the alternating-current frequency of said energy, said oscillatory circuit having a predetermined ohmic impedance at resonance, an electronic discharge tube having a predetermined plate impedance and a grid-control circuit, said tube receiving plate-circuit power from said source, said plate circuit including said winding, said grid-control circuit including said oscillatory circuit, a feed-back circuit from said plate circuit to said oscillatory circuit, said feed-back circuit including a resistance member having a higher ohmic impedance than that of said oscillatory circuit at resonance, and said ohmic impedance of said feed-back circuit being higher than said plate impedance, whereby said oscillating period is stabilized under operation with said voltage fluctuations.

5. An alternating-current motor system comprising a motor having a stator, a rotor and an electromagnetic field-winding having a predetermined inductance surrounding said stator to supply driving energy to said rotor; a source of direct-current power subject to voltage fluctuations, a capacitance-inductance parallel oscillatory circuit having a substantially constant oscillating period to fix the alternating-current frequency of said energy, an electronic discharge tube having a grid-control circuit and receiving plate-circuit power from said source, said plate circuit including said winding, said grid-control circuit including said oscillatory circuit, an energy feed-back coupling circuit from said field-winding to said oscillatory circuit, and means in said feed-back circuit preventing said inductance of said field-winding from altering said oscillating period of said oscillatory circuit.

6. An alternating-current motor system comprising a motor having a stator, an armature and an electromagnetic field-winding surrounding said stator to supply energy to impart periodic motion to said armature, a source of direct-current power subject to voltage fluctuations, a capacitance-inductance parallel oscillatory circuit having an independent oscillating period to fix the alternating-current frequency of said energy, an electronic discharge tube having a grid-control circuit and receiving plate-circuit power from said source, said plate circuit including said winding, said grid-control circuit including said oscillatory circuit, an energy feed-back circuit from said plate circuit to said oscillatory circuit, and said feed-back circuit including an impedance member to stabilize said oscillating period under operation with said voltage fluctuations, whereby said periodic motion is frequency stabilized by said oscillatory circuit.

MONTFORD MORRISON.